Feb. 20, 1962 W. T. HARRIS 3,022,487
ELECTROMAGNETIC TRANSDUCER
Original Filed Aug. 11, 1951

INVENTOR.
WILBUR T. HARRIS
BY James and Franklin
ATTORNEYS 3,022,487
ELECTROMAGNETIC TRANSDUCER
Wilbur T. Harris, Southbury, Conn., assignor to The Harris Transducer Corporation, Southbury, Conn., a corporation of Connecticut
Original application Aug. 11, 1951, Ser. No. 241,470, now Patent No. 2,978,671, dated Apr. 4, 1961. Divided and this application Jan. 7, 1959, Ser. No. 790,998
5 Claims. (Cl. 340—12)

My invention relates to electroacoustic transducers, and in particular to transducers suited to underwater operation. This application is a division of my application Ser. No. 241,470, filed August 11, 1951, and entitled "Electrodynamic Transducer," now Patent 2,978,671 of April 4, 1961.

Underwater transducers for the sonic range usually have efficiencies in the order of one-tenth to one percent, if they have substantially uniform response over a broad frequency range; they usually have efficiencies of five to fifty percent, if they are resonant, and this high efficiency is restricted to a frequency range in the order of one-tenth of an octave. Thus, the broad-band transducers are useful normally for receiving sound, where their low efficiency is not a great handicap, but are useless for high-power transmission. The resonant devices, on the other hand, are not versatile; they fail when broad frequency bands are to be transmitted, and a great multiplicity of transducers is required for different applications. Underwater sonic (sonar) transducers having efficiencies even as high as ten percent over an octave of frequency range would have been extremely welcome in the past.

The problems of transducer design can be discussed broadly in terms of the following equation:

$$\dot{x} = \frac{P(t)}{R + j\omega M - \frac{jk}{\omega}}, \quad \ldots \quad (1)$$

where $\dot{x}$ is the velocity of the radiating transducer surface in contact with the acoustic medium, $P(t)$ is the time-variable force developed by the transducer due to externally applied power, R is the resistance of the medium plus the mechanical friction and hysteresis of the device, M is the mass reactance of the medium plus the mass of the moving parts of the transducer, $k$ is the stiffness of the moving parts of the transducer, and $\omega$ is $2\pi$ times the frequency.

In the usual underwater-sound transducer, the ruggedness, strength, and volume of material required for developing large forces leads to a device which is relatively massive and stiff. Thus, at all frequencies either the mass or stiffness-reactance terms in the denominator are large compared to R. At resonance, these terms are equal in magnitude and hence cancel, leaving R as the term which limits the developed motion. Since R can usually be made largely radiative, this leads to a highly efficient device at resonance if the energy conversion mechanism contained in $P(t)$ is efficient. Hence, under resonant conditions, the device is resistance-limited, and to a large degree, radiation-limited—the ideal condition. At frequencies below the resonant frequency, the stiffness term is much greater than the others, and the device is said to be stiffness limited; above resonance the device is mass-limited. Under mass or stiffness limitation, the force $P(t)$ must be greatly increased to obtain the same amount of motion as can be obtained at resonance. The losses in the electromechanical coupling mechanisms are increased in the same proportion, and hence the efficiencies actually attained under reactance-limited conditions are usually low.

It is, accordingly, an object of the invention to provide an improved transducer of the character indicated.

It is another object to provide a transducer having high efficiency over an extended frequency range.

It is a further object to provide an improved non-resonant transducer.

Another object is to provide an improved, relatively highly efficient transducer for electroacoustic or acoustoelectric conversion in water and having further useful application in air.

More specifically, it is an object to provide an underwater sonic transducer construction in which R can be largely radiative and can be comparable to $\omega M$ in magnitude for a relatively wide frequency range.

Also specifically, it is an object to provide an underwater transducer in which stiffness can be negligible.

It is a general object to provide a transducer construction approaching the ideal of maintaining resistance limitation, and hence efficient broad-band performance, achieving these results with high power-handling capacity, large active area, ruggedness, and advantageous coupling to the medium.

Other objects and various further features of novelty and invention will be pointed out or will occur to those skilled in the art from a reading of the following specification in conjunction with the accompanying drawings.

In the drawings, which show, for illustrative purposes only, preferred forms of the invention—

Figure 1:
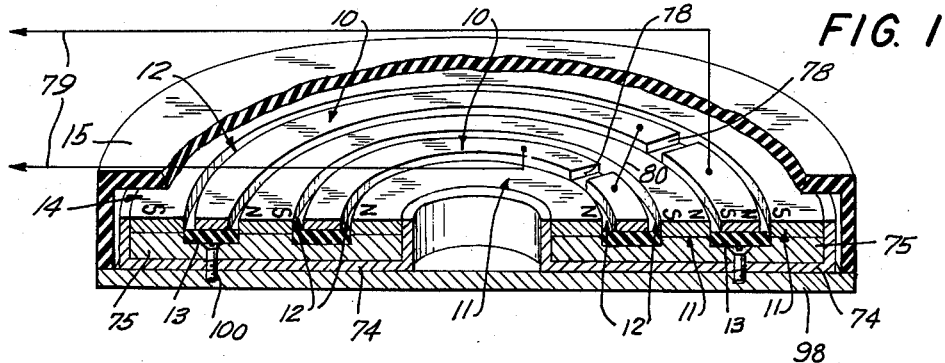
FIG. 1 is a perspective view, partially broken away and sectioned on a plane through the axis of symmetry, schematically showing an under-water transducer incorporating features of the invention.

Briefly stated, my invention contemplates sonic transducer constructions, particularly underwater transducer constructions, in which R can be largely radiative and can be comparable to $\omega M$ in magnitude for a wide frequency range, and in which the stiffness can be negligible. In order to achieve these results, I employ a low-mass active element at the interface between two media having preferably very substantially different acoustical impedances. One of these media may have the same acoustic impedance as the medium in which the transducer is to be employed. The active element may be electrically conductive and supported in a magnetic field, as in a magnetic-flux gap.

An appreciation of this principle of operation may be obtained from a theoretical approach, in which one considers the behavior of a sound wave traveling in a medium of acoustic resistance $\rho_1 C_1$ and impinging normally on the surface of the medium $\rho_2 C_2$ (see FIG. 1), where $\rho_2 C_2$ is very much smaller than $\rho_1 C_1$. The interface between media is identified by the reference numeral 9. If $P_1$ is the acoustic pressure amplitude of the incident wave, $P_{1'}$ the pressure amplitude of the reflected wave, and $P_2$ the transmitted pressure amplitude, and $V_1$, $V_{1'}$, and $V_2$ the corresponding acoustic volume currents (related to $\dot{x}$ of Equation 1), then the following relationships may be deduced:

$$P_2 = \frac{2P_1}{1 - \frac{\rho_1 C_1}{\rho_2 C_2}} \quad \ldots \quad (2)$$

$$U_2 = \frac{2U_1}{1 - \frac{\rho_2 C_2}{\rho_1 C_1}} \quad \ldots \quad (3)$$

$$P_1' = {}^{1/2}P_2\left(1 - \frac{\rho_1 C_1}{\rho_2 C_2}\right) \cdots \quad (4)$$

$$U_1' = {}^{1/2}U_2\left(\frac{\rho_2 C_2}{\rho_1 C_1} - 1\right) \cdots \quad (5)$$

If the medium 1 is water, $\rho_1 C_1$ is $1.5 \times 10^5$ acoustic ohms. If the medium 2 is air-cell rubber or rubber-like material, for which $\rho_2$ is approximately 0.3, then $\rho_2 C_2$ is approximately equivalent to the acoustic resistance of air, i.e., approximately 40 acoustic ohms, and $\rho_1 C_1$ is about 3800 times as large as $\rho_2 C_2$. Under such conditions, Equation 2 states that $P_2$, the pressure at the boundary, is very small as compared with the pressure $P_1$ in the impinging wave at a distance (a quarter wavelength or more) from the interface or boundary between the two media. Equation 3 shows that the motion $U_2$ in the boundary 9 is twice the motion associated with the incoming wave at a distance. Equation 4 shows that the pressure $P_1$ in the reflected wave at a distance is very much larger than the transmitted pressure, and is opposite in phase. From Equations 2 and 4, $P_1'$ is seen to be approximately equal to $P_1$ and opposite in sign. Finally, according to Equation 5, $U_1'$, the reflected current, is approximately one half as large as $U_2$, the current at the boundary, and is opposite in phase.

Equation 4 can be further interpreted to mean that, if the transducer exerts force on the boundary 9 (or creates force in this boundary), then the pressure $P_2$ encountered by this radiating transducer face is transformed by the factor $$\tfrac{1}{2}\left(1 - \frac{\rho_1 C_1}{\rho_2 C_2}\right)$$

to the larger radiated pressure $P_1'$. The velocity transformation (Equation 5) may always be characterized by a factor of approximately 2.

In my patent application Ser. No. 241,470, filed August 11, 1951, and entitled "Electrodynamic Transducer," now Patent 2,978,671, I have shown a number of transducer embodiments operating on the principles set forth above. This application is a division of the aforementioned application Ser. No. 241,470 and relates to certain transducer embodiments of the type under discussion which are of circular or arcuate shape.

In the drawings I show embodiments of the invention in connection with transducers which may have an effectively flat, generally circularly shaped, active surface of desired proportions. In these arrangements, the active elements are conductive strips generally designated 10, supported between adjacent parallel magnets generally designated 11. Strips 10 and magnets 11 may be provided in plurality, in an array convenient to the desired overall proportions. The magnets 11 may be of so-called Alnico V material and permanently magnetized so that magnetic-flux gaps are established between adjacent opposed poles of adjacent magnets at the gaps generally designated 12.

As explained above, I prefer that the active strips 10 be supported at the interface between two media having substantially different acoustic impedances, and in the form shown I have provided rings generally designated 13 of sound-attenuating material, such as air-filled rubber-like material, in operative relation to each gap 12, on which the conductive strips 10 are mounted. The conductive strips 10 may be bonded to the sound-attenuating material 13 so as to maintain sufficient insulated clearance with the adjacent poles of the gap.

On the other side of the active strips 10, the medium is preferably sound-transmitting, that is, in the medium in which the transducer is to be employed. For the underwater embodiment shown, I have provided a chamber 14 filled with a fluid having substantially the acoustic impedance of water and confined by means of an external sheath 15 of rubber-like material which is also preferably transparent to underwater acoustic energy.

Each active element 10 may be a single copper strip, or, if necessary, to reduce eddy-current losses, each strip may be a laminated build-up of a plurality of bonded strips. Electrical connections to the strips may be accomplished by placing all strips 10 in parallel, as by connecting one end of all strips to one pole and the other end of all strips to the other pole. However, this would make for unduly low electrical impedance, and I, therefore, prefer the series connection of all strips 10.

In the specific form shown, optimum usage of the ferromagnetic material, Alnico V, requires that the width of the magnets be substantially twice the gap width, for which condition a magnetic field of 10,000 gausses can be supported in the gaps. Thus, of the total face area of a transducer utilizing Alnico V, substantially one-third may be active. It will be understood that as long as the wavelength is very large compared to the active-element spacing, this area condition may provide an advantageous lowering of the impedance of the medium (water) presented to the radiating strips 10.

As pointed out previously, the acoustic impedance of air-filled rubber at atmospheric pressure is approximately 3800 times less than the acoustic impedance of water. At 600-ft. water depth, this ratio is reduced to approximately 200. This change in the impedance ratio need not appreciably affect the mechanics of the device, and hence its performance need not be seriously impaired at moderate depths in water. However, in designing for extreme-depth operation, it is important that the magnet thicknesses (and active gap depths) should be adequate to allow for the compression of the air cell rubber. Thus, for an assumed transducer having magnets 1-in. wide by ⅜-in. thick, and laminated strips ⁷⁄₁₆-in. wide by 0.025-in. thick, the active strips might lie approximately 2 mm. below the outer surfaces of the magnets at atmospheric pressure, and at maximum depths the strips might lie approximately 2 mm. above the back surfaces of the magnets.

If the present transducers are to be used as high-power projectors, the strips may need to carry currents in the order of 100 amperes per centimeter of width, and hence exert pressures in the orders of $10^5$ dynes/cm.$^2$. Heavy leads and an approximately large transformer may deliver such currents, and power output may be in the order of 1 to 10 kilowatts per square meter of transducer face throughout the audio range. If, on the other hand, the transducers are to be used as receivers, relatively small transformers can be employed, but the construction of the actual transducer may advantageously be left unchanged.

Figure 2:
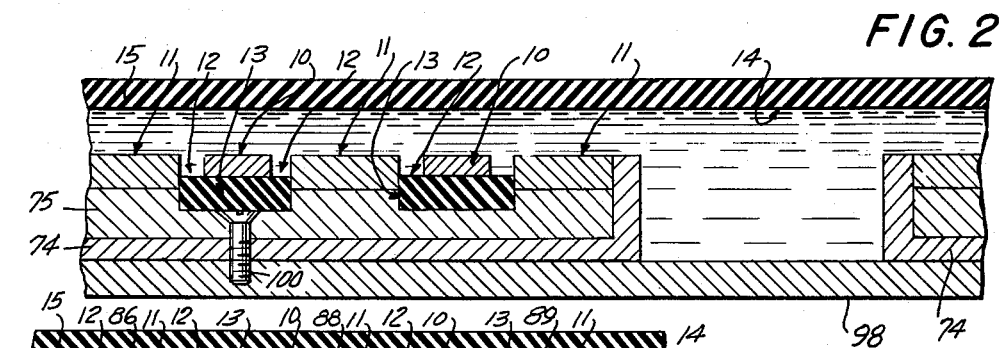
FIG. 2 is a fragmentary cross sectional view of the transducer of FIG. 1 on an enlarged scale.

In this application I illustrate generally circular or arcuate embodiments of transducers operating on the above principles. In both illustrated embodiments, generally circular or arcuate magnet elements are radially spaced to define annular magnetic-flux gaps, and the conducting strips 10 are generally circular or arcuate. In FIGS. 1 and 2 a concentric array of magnetized rings 11 is arranged in a series-magnetic circuit, with a suitably formed ferromagnetic means 74 to close the magnetic circuit. A frame member 75 of non-magnetic material may be embraced by ferromagnetic means 74 and may support all magnetic rings 11. Electrical-conducting means in the form of the rings 10 may be supported in the annular flux gaps between the rings 11 and each of these rings 10 is circumferentially discontinuous, as indicated by the single break 78 in each ring. Heavy solid lines 79—80 schematically indicate an electrical interconnection of the active elements. Air-filled rubber or the like inserts 13 may support the strips 10.

Figure 3:
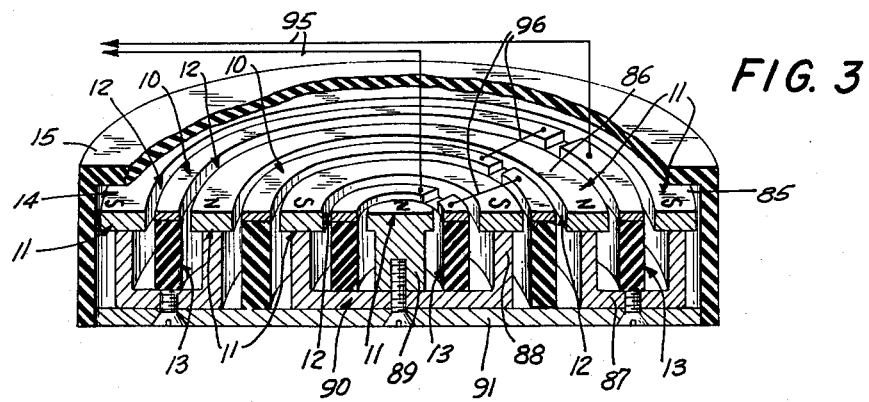
FIG. 3 is a view similar to FIG. 1 but showing an alternative embodiment.
Figure 4:
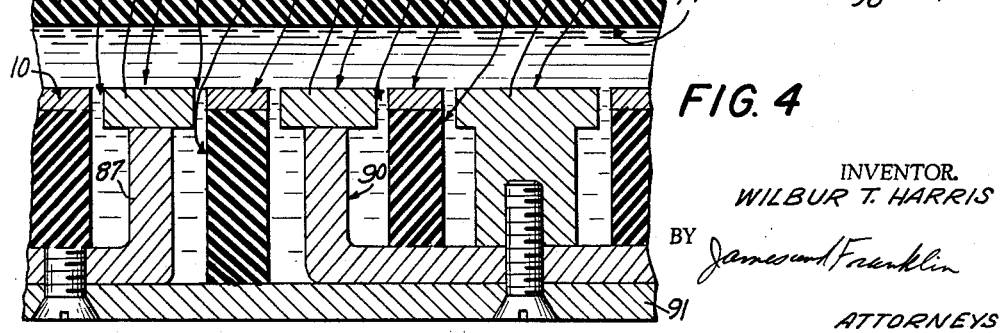
FIG. 4 is a fragmentary cross sectional view on an enlarged scale of the embodiment of FIG. 3.

In FIGS. 3 and 4 the circular form of a parallel magnetic circuit is illustrated. The magnetic-flux gaps are again annular, but they are defined between annular horseshoe magnets and between the poles of each such magnet. Thus, a first annular gap may be defined between the poles 85, 86 of a first annular magnet 87; a second annular gap may be defined between the poles 88—89 of a second annular magnet 90, and a third annular gap may be defined between adjacent poles 86—88 of the adjacent magnets 87—90. A backing plate 91 may hold the magnets together. Arcuate conductor strips 10 may be supported in the gaps on air-filled rubber inserts 13, and a series electrical connection of the strips 10 is schematically indicated by leads 95 and jumpers 96.

In the embodiment of FIGS. 1 and 2 a base plate 98 is provided, to which the magnetic structure 10, 74, 75 may be secured in any appropriate manner, as by the screws 100, and to which the external sheath 15 is also secured in any appropriate manner. In the embodiment of FIGS. 3 and 4 the external sheath 15 may be secured in any desired manner to the backing plate 91.

It will be seen that I have described novel acousto-electric and electro-acoustic transducer means applicable to air and water use. The construction provides especially advantageous underwater features, including great power-handling capacity over a relative broad frequency band. The basic construction is relatively simple and lends itself to arrays of almost any desired configuration.

While I have described my invention in detail for the preferred forms shown, it will be understood that modifications may be made within the scope of the invention, as defined in the following claims.

I claim:

1. An electromagnetic transducer comprising housing means, means including a first medium having substantially the sound-transmitting properties of water and contained by said housing means and defining an acoustic-response face on one side of said housing means, a second medium within said housing means, said second medium being adjacent said first medium behind said face and having substantially the sound-transmitting properties of air, an array of spaced magnets and magnetic-flux gaps within said transducer and behind said face, said array comprising generally radially spaced generally arcuate magnets defining a series of generally radially spaced generally arcuate flux gaps therebetween, generally arcuate metallic conducting strips yieldably supported in the magnetic fields of said gaps, said strips being in direct driving relation with said first medium at the interface between said media, and means making electrical connection with said strips.

2. In a transducer of the character indicated, magnetic means comprising generally radially spaced generally arcuate magnetic elements defining a series of generally radially spaced generally arcuate flux gaps therebetween, generally arcuate metallic conducting strips located in the fields of said gaps, a medium having substantially the sound-transmitting properties of water on one side of said strips and in intimate contact with said one side, and a medium having substantially the sound-transmitting properties of air on the other side of said strip and in intimate contact with said other side.

3. In a transducer of the character indicated, a support, magnetic means on said support comprising generally radially spaced generally arcuate magnets defining a series of generally radially spaced generally arcuate flux gaps therebetween, generally arcuate metallic conducting strips in said gaps, a sound transmitting material carried by said support on that side of said strips directed toward the medium in which said transducer is adapted to be immersed and interposed between said strips and said medium, a sound-attentuating material on the other side of said strips, one of said materials supporting said strips in said gap.

4. The transducer of claim 3, in which said sound-attentuating material supports said strips in said gap.

5. In a transducer of the character indicated, a support, a plurality of horseshoe magnets of revolution on said support including spaced pole pieces defining between themselves generally radially spaced generally arcuate gaps traversed by magnetic flux, generally arcuate metallic conducting strips in said gaps, sound-transmitting material carried by said support on that side of said strips directed toward the medium in which said transducer is adapted to be immersed and interposed between said strips and said medium, and sound-attentuating means between said pole pieces on the other side of said strips and supporting said strips in said gaps.

References Cited in the file of this patent

UNITED STATES PATENTS

| | | | |
|---|---|---|---|
| 1,637,397 | Sykes | Aug. 2, | 1927 |
| 1,653,128 | Smith | Dec. 20, | 1927 |
| 1,732,029 | Round | Oct. 15, | 1929 |
| 2,214,591 | Massa | Sept. 10, | 1940 |
| 2,249,160 | Mott | July 15, | 1941 |
| 2,402,697 | Turner | June 25, | 1946 |
| 2,413,012 | Turner | Dec. 24, | 1946 |
| 2,419,608 | Turner | Apr. 29, | 1947 |
| 2,561,368 | Hayes et al. | July 24, | 1951 |
| 2,566,850 | Mott | Sept. 4, | 1951 |